United States Patent [19]

Kan et al.

[11] 3,879,389

[45] Apr. 22, 1975

[54] PROCESS FOR THE PREPARATION OF 2,4,6-TRIS(ALKANOL-SUBSTITUTED AMINO)-S-TRIAZINES

[75] Inventors: Peter T. Kan, Plymouth; Moses Cenker, Trenton, both of Mich.

[73] Assignee: Basf Wyandotte Corporation, Wayne, Mich.

[22] Filed: July 5, 1973

[21] Appl. No.: 376,892

Related U.S. Application Data

[63] Continuation-in-part of Ser. No. 215,675, Jan. 5, 1972, abandoned.

[52] U.S. Cl. ............................................. 260/249.6
[51] Int. Cl. .............................................. C07d 55/22
[58] Field of Search ................................. 260/249.6

[56] References Cited
UNITED STATES PATENTS

| | | | |
|---|---|---|---|
| 2,394,306 | 2/1946 | Hentrich et al. | 260/249.6 X |
| 3,573,301 | 3/1971 | Winter | 260/249.6 |

OTHER PUBLICATIONS

J.A.C.S., Vol. 73, 2984 (1951), Kaiser et al.

*Primary Examiner*—John M. Ford
*Attorney, Agent, or Firm*—Joseph D. Michaels; Bernhard R. Swick; Robert E. Dunn

[57] ABSTRACT

2,4,6-Tris(alkanolsubstituted amino)-s-triazines are prepared by reacting stoichiometric quantites of secondary alkanolamines and aqueous cyanuric chloride in the presence of certain inorganic compounds and a coupling or wetting agent. By the process it is possible to prepare 2,4,6-tris(N-methylethanolamino)-s-triazine, a catalytic compound useful in the preparation of rigid foams characterized by carbodiimide linkages.

6 Claims, No Drawings

PROCESS FOR THE PREPARATION OF 2,4,6-TRIS(ALKANOL-SUBSTITUTED AMINO-S-TRIAZINES

The subject application is a continuation-in-part of U.S. patent application Ser. No. 215,675, filed Jan. 5, 1972, now abandoned.

BACKGROUND OF THE INVENTION

1. Field of the Invention

The present invention concerns the preparation of 2,4,6-tris(alkanolsubstituted amino)-s-triazines. More particularly the present invention concerns improved methods for preparing such compounds from secondary alkanolamines and cyanuric chloride.

2. Prior Art

The preparation of 2,4,6-tris(N-alkylamino)-s-triazine derivatives has previously been detailed by Kaiser et al., *JACS*, 73, 2984 (1951). According to Kaiser et al., an appropriately substituted secondary amine is reacted with an aqueous slurry of cyanuric chloride to yield an amino-substituted triazine and hydrochloric acid. In the absence of other reagents, the hydrochloric acid by-product will react with any unreacted remaining secondary amine to form a hydrochloride salt which is unreactive with cyanuric chloride, thereby inhibiting the use of stoichiometric quantities of reagents. Thus, except where excess secondary amine is employed, Kaiser et al. teach the intermittent addition to the reaction of an inorganic alkaline material to neutralize the hydrochloric acid by-product. To achieve this, it is necessary to continuously monitor the pH of the system so that it is maintained between 6 and 7 since excess alkalinity promotes the water-cyanuric chloride reaction thus yielding other undesirable by-products.

Also, by practicing the process described by Kaiser et al., the yields are quite low making such a process impractical for commercial application.

Another problem resulting from the described process is that, absent vigorous agitation, which is achieved only on a laboratory scale, cyanuric chloride, due to its poor wettability, floats on top of the water used to make up the slurry, making the reaction slow and tedious.

The present invention seeks to overcome these difficulties by an improved process for preparing such substituted traizines.

SUMMARY OF THE INVENTION

According to the present invention, 2,4,6-tris-(alkanolsubstituted amino)-s-triazines are prepared by reacting stoichiometric quantities of an appropriately substituted secondary amine and cyanuric chloride in the presence of certain inorganic compounds and either a coupling agent or wetting agent. The products prepared in accordance with the process of the subject invention have been found to be useful catalysts in the preparation of rigid foams characterized by carbodiimide linkages.

The inorganic compounds contemplated herein either neutralize the hydrochloric acid without increasing the alkalinity of the system or are hydrochloric acid-reactive, water-insoluble inorganic compounds which are of such inherently low solubility that there is no basicity attributed to the system.

The coupling agents or wetting agents increase the wettability of cyanuric chloride, without requiring vigorous agitation, thereby enabling an increase in the rate of reaction.

For a more comprehensive discussion of the present invention, reference is made to the following detailed description and examples thereof.

DESCRIPTION OF THE PREFERRED EMBODIMENTS

In accordance with the present invention, a 2,4,6-tris(alkanolsubstituted amino)-s-triazine is prepared by reacting at essentially stoichiometric ratios a secondary alkanolamine with cyanuric chloride in the presence of (1) an inorganic buffering compound or a hydrochloric acid-reactive, water-insoluble inorganic compound and (2) either a coupling agent or a wetting agent.

The secondary amines which are amenable to the present process can be represented by the formula:

wherein R is an alkanol group having from 2 to 4 carbon atoms and R' is selected from the group consisting of alkyl having from 1 to 4 carbon atoms and alkanol having from 2 to 4 carbon atoms. Representative compounds contemplated as useful amines are, for example, N-methylethanolamine, N-ethylethanolamine, N-isopropylethanolamine, N-butyl-ethanolamine, N-methylpropanolamine, diethanolamine, and di-i-propanolamine.

Cyanuric chloride is utilized herein as an aqueous slurry thereof, generally containing from about b 5 to 50% by weight of cyanuric chloride, based on the total weight of the slurry. Preferably, the aqueous slurry contains from about 15 to 25% by weight of cyanuric chloride.

To neutralize the hydrochloric acid generated from the reaction, an inorganic compound which is either a buffering agent or a hydrochloric acid-reactive, water-insoluble, compound is incorporated into the reaction system. The buffering agents which are employed herein neutralize hydrochloric acid upon its formation but do not increase the alkalinity of the system, due to the inherently low basicity of the buffering compound.

Representative examples of the buffering agents contemplated for use herein include the borates, bicarbonates and phosphates of an alkali or alkaline earth metal. Representative compounds include sodium bicarbonate, disodium acid phosphate, sodium borate, lithium bicarbonate, rubidium bicarbonate, cesium bicarbonate, dipotassium acid phosphate and the like. In the practice of the present invention, the preferred buffering agent is sodium bicarbonate.

As noted above, as an alternative for the buffering agent addition, it is contemplated that hydrochloric acid-reactive, water-insoluble inorganic compound be added to the reaction system. These compounds, which react with hydrochloric acid to form an insoluble salt and water, are of such limited water-solubility that they are, essentially, insoluble and, therefore, do not contribute to the basicity of the system.

Representative of the class of compounds contemplated are, for example, alkaline earth metal oxides and hydroxides such as magnesium oxide, barium oxide, strontium oxide, magnesium hydroxide, barium hydroxide, strontium hydroxide and the like.

Whether a buffering agent or insoluble hydrochloric acid-reactive inorganic compound is used, they are both employed in stoichiometric quantities equivalent to the moles of hydrochloric acid generated.

In order to delimit the need for extremely vigorous agitation of the cyanuric chloride, thereby enabling preparation of the triazines on a commercial scale, the present invention also contemplates the use of a coupling agent or a wetting agent to increase the wettability of cyanuric chloride and, thus, eliminate the need for vigorous agitation of the system. It has been found the use of a wetting or coupling agent, in lieu of vigorous agitation, increases the rates of reaction between the secondary amine and the chloride. The function of the coupling agents is to make the reactants more soluble in the reaction medium and thus increase the rate of reaction. The function of the wetting agents is to increase contact between the insoluble cyanuric chloride and the amine solution and thus increase the reaction rate.

Among the coupling agents which are useful herein are the low molecular weight ketones such as acetone, methyl ethyl ketone, methyl n-propyl ketone, ethyl ketone, methyl isopropyl ketone and the like. Other useful coupling agents include low molecular weight ethers such as dioxane, tetrahydrofuran and the like. The preferred coupling agent is acetone.

The wetting agents are added to the reaction system to promote the wettability of cyanuric chloride and function similarly to the coupling agents. Suitable wetting agents are the well-known anionic wetting agents although cationic or nonionic surface active agents can also be used.

Suitable anionic surfactants are the alkali metal salts of sulfosuccinic acid esters, such as sodium dioctyl sulfosuccinate, ammonium or alkali metal salts of alkylaryl sulfonates wherein the alkylaryl group is $C_8-C_{15}$ alkyl substituted phenyl, $C_{10}-C_{18}$ alcohols.

Exemplifying the useful cationic surfactants are, for example, alkyl benzyl-trimethyl ammonium chlorides, wherein the alkyl group may be $C_8-C_{20}$ alkyl chain, or mixtures thereof.

Other useful cationic surfactants are the alkyl pyridinium chlorides wherein the alkyl group is $C_{10}-C_{22}$ alkyl chain or mixtures thereof.

The nonionic surfactants which can be used in the practice of the present invention are alkylene oxide adducts of $C_8-C_{20}$ alcohols containing 55 to 80% polyoxyethylene groups or mixed polyoxyethylene-polyoxypropylene groups, such as descibed in U.S. Pat. Nos. 3,340,609 and 3,504,041, block copolymers of ethylene oxide and propylene oxide, or mixtures of propylene and butylene oxides, such as described in, inter alia, U.S. Pat. No. 2,674,619.

The coupling agent can be used in an amount, generally, ranging from about 1 part to 10 parts by weight thereof per part by weight of cyanuric chloride. Preferably the wetting agent or coupling agent is used in amounts ranging from about 2 parts to 4 parts by weight thereof per part by weight of cyanuric chloride.

The wetting agents can be used in an amount to give a concentration of 0.01 to 1.0% by weight, based on the amount of water used, preferably in a concentration of 0.025 to 0.25%.

The process of the present invention generally comprises a three-stage reaction which is dictated by the nature of cyanuric chloride. As is known, upon substitution of one of the chlorine atoms of cyanuric chloride, the reactivity of the remaining chlorine atoms is modified such that a different temperature is required to effectuate subsequent reaction with the secondary amine. Thus, the first stage of the reaction is generally carried out at a temperature ranging from about 0°C. to about 5°C., for a period of about one to two hours, during which time the secondary amine is continuously added with stirring to the aqueous cyanuric chloride. The second stage of the reaction is generally conducted over a temperature ranging from about 20°C. to about 30°C. from a period of from about one hour to four hours.

The third stage of the reaction is generally carried out at a temperature ranging from about 95°C. to 115°C. for a period ranging from about two hours to about four hours. During this stage of the reaction, which is conducted at the boiling point of the reaction mixture, water and the coupling agents are distilled off.

After the third stage of the reaction is completed, the triazine compound is recovered by any conventional procedure.

In carrying out the process of the present invention, the wetting agent or coupling agent is added to the reaction system during the first stage of the reaction. The point of addition of the inorganic compound is dependent on the type of compound selected. The buffering compound, since it affects the pH of the reaction system, is preferably added at the completion of the first stage of the reaction and prior to commencing the second stage thereof. If added prior to this point, the yield of triazine product is reduced. The hydrochloric acid-reactive, water-insoluble, inorganic compound, because of its nature, can be added to, during, or after completion of the first stage of the process.

It is thus seen that the present method generally comprises:

a. reacting stoichiometric quantities of aqueous cyanuric chloride and a secondary alkanolamine at a temperature of about 0°C. to 5°C. for a period ranging from about one to two hours, the reaction being conducted in the presence of (1) a coupling agent or a wetting agent and (2) inorganic buffering compound or a hydrochloric acid-reactive, water-insoluble inorganic compound;

b. heating the product of (a) at a temperature ranging from about 20°C. to about 30°C. for a period ranging from about one to four hours;

c. heating the product of (b) at a temperature ranging from about 95°C. to 115°C. for a period of about one to four hours, and d. recovering a 2,4,6-tris(alkanolsubstituted amino)-s-triazine.

In accordance with and in another aspect of the present invention, the above-defined process renders itself particularly amenable to the reaction between N-methyl-ethanolamine and cyanuric chloride to yield 2,-4,6-tris(N-methylethanolamino)-s-triazine, a composition of matter more particularly described in U.S. Pat. No. 3,573,301 and which is extremely useful as a catalyst for the preparation of rigid foams characterized by carbomdiimide linkages. The development and utility of this compound is more fully detailed in copending U.S. Pat. application Ser. No. 169,470, filed Aug. 5, 1971, now U.S. Pat. No. 3,717,596, and entitled, "Carbodiimide Foams and Process for Preparaing Carbodiimide Foams from Co-catalyst Systems".

For a more complete understanding of the present invention, reference is made to the following examples, which are not to be construed as limiting the invention. In the examples all parts, absent indications to the contrary, are by weight.

EXAMPLE I

To a 3-liter, 4-neck flask equipped with agitation means, thermometer well, water-cooled condenser, and dropping funnel, disposed in a cooling bath is charged 500 mls. of acetone. After the acetone is cooled to about 0°C. to 5°C. and while maintaining this temperature, 184.5 parts of cyanuric chloride is rapidly added to the flask. This is then followed by the addition of 750 parts of water thereto and a fine suspension is formed. The temperature of the suspension rises to about 10°C. to 15°C. but is cooled down to the 0°C. to 5°C. temperature range. The dropping funnel, which is charged with 225 parts of N-methylethanolamine, is opened and the amine is added dropwise to the aqueous cyanuric chloride maintained at the aforesaid temperature. After about one hour the amine addition is completed. Next, 252 parts of sodium bicarbonate is added to the slurry at 0°C. to 5°C. over a 5 to 10-minute period. The resulting slurry is mixed for about 5 minutes to ensure adequate dispersion. The first stage of the reaction is concluded by removing the cooling bath.

Stage 2

Upon removal of the cooling bath, the reaction mixture is, under agitation, allowed to heat up to about 25°C. over a period of about 3 hours.

Stage 3

After the mixture has reached about 25°C., the reaction vessel is then equipped with a 6-inch Vigreaux column and heat is applied to the vessel at a rate sufficient to reach a temperature of about 100°C. in about 1.5 hours, during which time acetone and water is distilled off. After reaching 100°C. distillation is maintained for about two hours, during which time further amounts of water and acetone are removed. Distillation is then discontinued and the mixture is refluxed at about 105°C. for about one more hour.

Recovery

After the third stage is completed, the crude product is cooled and transferrd to a 2-liter separatory funnel. The lower organic fraction is separated out and stripped of water at 10 mm. Hg. vacuum at 60°C. to 70°C. Six hundred mls. of ethyl acetate is then added to the dried fraction and the resulting mixture is gently stirred and heated with a steam bath at 50°C. to 60°C. to effect solution. The solution is then filtered to remove any insolubles and the filtrate is then cooled to about 5°C. – 10°C. whereupon, after about 2 hours under gentle agitation, 268 parts of white, fine crystals of 2,4,6-tris-(N-methylethanolamino)-s-triazine precipitate out of solution. A second crop yields eight more parts of the triazine. The total recovery was 274 parts of triazine or a 92% yield based on theoretical calculations.

EXAMPLE II

This example illustrates the preparation of 2,4,6-tris(N-methylethanolamino)-s-triazine by the present process using an anionic wetting agent and a hydrochloric acid-reactive, water-insoluble, inorganic compound.

Into a 2-liter flask fitted with a slow speed stirrer, thermometer, dropping funnel and six-inch Vigreaux column having a variable reflux take-off head and reflux condenser disposed thereatop and containing 1,000 parts of water and 10 parts of sodium dioctyl sulfosuccoinate is added 66.0 parts (3.3 equivalents) of magnesium oxide and 84.5 parts (one mole) of cyanuric chloride which are immediately wetted and settle to the bottom of the flask. Concurrent with the addition of cyanuric chloride and magnesium oxide to the flask 225 parts (3 moles) of N-methylethanolamine is charged into the dropping funnel. The slurry in the flask is stirred in an ice bath until a temperature of about 2°C. is achieved at which time dropwise amine addition is begun and lasts over a period of about 50 minutes while maintaining the contents in the flask at about 0°C. to 5°C.

After the amine addition is completed, the reaction mixture is stirred and allowed to slowly warm to room temperature (about 1.5 hours). After attaining room temperature the mixture is then stirred and maintained thereat for one further hour, thus concluding the second stage of the reaction.

After the second stage is completed, heat is slowly applied to achieve the reflux temperature (about 100°C.) of the reaction mixture after about 45 minutes. Seven hundred mls. of water is then distilled off over a period of about three hours. The crude product remaining in the flask is then cooled, filtered and the product is then purified and recovered following the procedure of Example I.

Two hundred and fifty-five parts (85% of theoretical) of 2,4,6-tris(N-methylethanolamino)-s-triazine is thereby recovered.

EXAMPLE III

The procedure described in Example I is duplicated with the exception that the amine employed was N-diethanol-amine. The product obtained, 2,4,6-tris(N'-diethanolamino)-s-triazine, was a white solid. The above procedure is duplicated employing sodium borate as the buffering compound. Results substantially as described in Example I are obtained. Moreover, the product exhibits catalytic activity in the preparation of rigid foams characterized by carbodiimide linkages.

The embodiments of the invention in which an exclusive property or privilege is claimed are defined as follows:

1. A process for preparing 2,4,6-tris-(alkanolsubstitutde amino)-s-triazine which comprises:
   a. reacting stoichiometric quantities of an aqueous slurry of cyanuric chloride and a secondary amine having the formula:

wherein R is an alkanol group having from 2 to 4 carbon atoms and R' is selected from the group consisting of alkyl having from 1 to 4 carbon atoms and alkanol having from 2 to 4 carbon atoms, at a temperature of about 0°C. to about 5°C. for a period of about 1 to 2 hours, the addition being done in the presence of (1) from 1 part to 4 parts by weight per part of cyanuric chloride of a coupling agent selected from the group consisting of acetone, methyl ethyl ketone, methyl-n-propyl ketone, ethyl ketone, and methyl isopropyl ketone, and (2) a compound selected from the group consisting of a sodium or lithium borate, phosphate and bicarbonate, and a magnesium, barium or strontium oxide and hydroxide;
b. heating the product of (a) at a temperature ranging from about 20°C. to about 30°C. for a period of about 1 hour to 4 hours;
c. heating the product of (b) for a period of about 1 hour to 4 hours at a temperature of about 95°C. to about 115°C.; and
d. therefter recovering the 2,4,6-tris-(alkanolsubstituted amino)-s-triazine.

2. The process of claim 1 wherein (2) is sodium bicarbonate.

3. The process of claim 1 wherein the secondary amine is N-methylethanolamine.

4. The process of claim 1 wherein the secondary amine is a dialkanolamine.

5. The process of claim 1 wherein the coupling agent is acetone.

6. A process for preparing 2,4,6-tris(alkanolsubstituted amino)-s-triazine which comprises:
a. reacting stoichiometric quantities of an aqueous slurry of cyanuric chloride and a secondary amine having the formula:

wherein R is an alkanol group having from 2 to 4 carbon atoms and R' is selected from the group consisting of alkyl having from 1 to 4 carbon atoms and alkanol having from 2 to 4 carbon atoms, at a temperature of about 0°C. to about 5°C. for a period of about 1 to 2 hours, the addition being done in the presence of (1) a wetting agent selected from the group consisting of alkali metal salts of sulfosuccinic acid esters, ammonium and alkali metal salts of alkylaryl sulfonates, sulfated ethoxylated $C_{10}$–$C_{18}$ alcohols, $C_8$–$C_{20}$ alkyl benzyl-trimethyl ammonium chlorides, $C_{10}$–$C_{22}$ alkyl pyridinium chlorides and alkylene oxide adducts of $C_8$–$C_{20}$ alcohols, and (2) a compound selected from the group consisting of a sodium or lithium borate, phosphate, and bicarbonate, and a magnesium, barium or strontium oxide and hydroxide;
b. heating the product of (a) at a temperature ranging from about 20°C. to about 30°C. for a period of about 1 hour to 4 hours;
c. heating the product of (b) for a period of about 1 hour to 4 hours at a temperature of about 95°C. to about 115°C.; and
d. thereafter recovering the 2,4,6-tris-(alkanolsubstituted amino)-s-triazine.

* * * * *